United States Patent
Hinterberger et al.

(10) Patent No.: US 11,031,793 B2
(45) Date of Patent: Jun. 8, 2021

(54) BATTERY AND METHOD OF OPERATING A BATTERY

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 258 days.

(21) Appl. No.: 16/353,240

(22) Filed: Mar. 14, 2019

(65) Prior Publication Data

US 2019/0288522 A1    Sep. 19, 2019

(30) Foreign Application Priority Data

Mar. 15, 2018    (DE) .......................... 102018203997.6

(51) Int. Cl.
*H02J 7/00* (2006.01)
*H01M 10/42* (2006.01)

(52) U.S. Cl.
CPC .......... *H02J 7/0016* (2013.01); *H01M 10/425* (2013.01); *H02J 7/0021* (2013.01); *H01M 2010/4271* (2013.01); *H01M 2220/20* (2013.01)

(58) Field of Classification Search
CPC ...... H02J 7/0016; H02J 7/0021; H02J 7/0031; H01M 10/425; H01M 2010/4271; H01M 2220/20
USPC ......................................... 320/104, 117, 122
See application file for complete search history.

(56) References Cited

U.S. PATENT DOCUMENTS

| | | | |
|---|---|---|---|
| 2012/0091963 | A1 | 4/2012 | Vance et al. |
| 2013/0169038 | A1* | 7/2013 | King ..................... H02J 7/0031 307/10.1 |
| 2014/0015488 | A1* | 1/2014 | Despesse ................ B60L 58/12 320/122 |
| 2018/0026315 | A1 | 1/2018 | Hinterberger et al. |
| 2018/0191176 | A1* | 7/2018 | Sherstyuk ............. H02J 7/0016 |

FOREIGN PATENT DOCUMENTS

| | | |
|---|---|---|
| DE | 102011089655 A1 | 6/2013 |
| DE | 102012011061 A1 | 12/2013 |
| DE | 102015002077 B3 | 6/2016 |
| DE | 102015002148 A1 | 8/2016 |
| WO | 2012136252 A1 | 10/2012 |
| WO | 2016131734 A1 | 8/2016 |

OTHER PUBLICATIONS

Examination Report dated Dec. 12, 2018 of corresponding German application No. 102018203997.6; 24 pages.

* cited by examiner

*Primary Examiner* — Paul Dinh
(74) *Attorney, Agent, or Firm* — Maier & Maier, PLLC

(57) ABSTRACT

A battery and a method for operating a battery, in particular for a motor vehicle, including multiple battery cells, which have respective battery cell housings with electric terminals via which the battery cells are electrically interconnected, wherein a respective cell branch connecting the terminals and having a galvanic cell is arranged in the battery cell housings, a respective bypass branch for bypassing the respective galvanic cell is arranged in the battery cell housings; each cell branch has a first switching element for opening and closing the cell branch, and each bypass branch has a second switching element for opening and closing the bypass branch.

13 Claims, 2 Drawing Sheets

BATTERY AND METHOD OF OPERATING A BATTERY

BACKGROUND

The invention relates to a battery, in particular for a motor vehicle, of the type specified in the preamble the claim 1. Furthermore, the invention relates to a motor vehicle with such a battery and a method for operating such a battery.

FIELD

It is known per se that in batteries composed of several modules with respective battery cells, the modules are interconnected differently according, as needed. For example, DE 10 2012 011 061 A1 discloses a power supply device, which has multiple battery modules connected in series. The battery modules comprise respective feedthroughs, whereby the battery modules can be connected or disconnected, as needed, for series connection.

DE 10 2011 089 655 A1 discloses a power supply device, which can connect different battery modules in parallel or in series, in particular as a function of a requested power.

Furthermore, WO 2012/136252 A1 discloses a modular multi-level converter, which can interconnect the respective battery cells correspondingly in order to generate a desired voltage via switching devices that are external to the battery cell.

SUMMARY

It is the object of the present invention to provide a solution, whereby a battery having several battery cells can be adapted particularly easily to different requests.

This object is achieved by a battery and a method for operating such a battery having the features of the independent claims. Advantageous embodiments with functional and non-trivial developments of the invention are specified in the dependent claims.

The battery according to the invention, in particular for a motor vehicle, comprises multiple battery cells, which have appropriate battery cell housings with electric terminals, with which the battery cells are electrically interconnected. In each of the battery cell housings, a cell branch with a galvanic cell connecting the terminals is arranged. The battery according to the invention is characterized in that a bypass branch for bypassing the respective galvanic cell is arranged in the battery cell housings. Each cell branch has a first switching element for opening and closing the cell branch, whereby each bypass branch has a second switching element for opening and closing the bypass branch. Moreover, the battery comprises a control unit, which is designed to control all switching elements of the battery cells, such that the galvanic cells of the battery cells are connected or bypassed, while meeting at least one specifiable request. The battery according to the invention is therefore a type of dynamically configurable battery system, i.e., dynamically configurable at the cell level.

A battery according to the invention is in principle an interconnection of multiple similar galvanic cells or elements. This may basically include both primary and secondary cells. Above all, the battery is not limited to being used exclusively in motor vehicles, but may be used to power any device. The battery cells may also be so-called solid-state cells, as well as conventional galvanic cells, such as, e.g., lithium-ion cells, or the like. Likewise, the battery cells may also be, e.g., fuel cells. Said switching elements may be electronic switching elements, i.e., e.g., field-effect transistors or diodes. The switching elements may also be electromechanical switches, such as relays. It is essential that the switching elements be able to connect the respective cell branches with the galvanic cells and the bypass branches, i.e., connect the respective branches either electrically conductively or separate them electrically.

It is essential for the battery according to the invention that both the said bypass branch and the respective switching elements of the cell branches and bypass branches be integrated directly into the battery cells themselves, and more specifically, within the battery cell housings. The battery according to the invention can thus be designed particularly space-savingly, in that no elements need to be attached to the battery cells in order to connect and disconnect the individual battery cells. As a result, less cabling is needed overall than is the case with conventional batteries. The battery according to the invention generally also has significantly less sources of error, in that the individual battery cells already integrate the essential components, which are needed for the different interconnections of the battery cells. For example, the battery cells of the battery according to the invention need not be connected to printed circuit boards, or the like, as the control unit is integrated in the battery, preferably decentrally, via individual control units in the battery cells.

Using the battery according to the invention makes it possible to control individual energy flows at the cell level, which was not possible with conventional methods. Thus, the battery according to the invention makes it possible to take corrective action at the module level or the overall battery level, as well as at the cell level. Basically, central control of connecting and bypassing the battery cells, including decentralized control, is possible here. Only by integrating the switching elements and the bypass branch in the appropriate battery cell housings is it at all possible to effectively connect and disconnect the individual battery cells at the battery cell level. Using the battery according to the invention opens up entirely new possibilities, which was previously not at all the case with conventional batteries.

An advantageous embodiment of the invention provides that at least part of the switching elements is arranged in an appropriate wet area of the battery cell housing, in which an electrolyte of the respective galvanic cells is accommodated; This allows for the individual battery cells to be produced in a particularly cost-effective way, as there is no need for separate encapsulation of the switching elements. If the switching elements are electronic switching elements, they can be protected, e.g., via suitable housings, or the like, from a potentially aggressive electrolyte.

A further advantageous embodiment of the invention provides that at least part of the switching elements is arranged in an appropriate wet area of the battery cell housing, spatially separated from an electrolyte of the respective galvanic cells; Thus, the switching elements are advantageously unexposed to a potentially aggressive electrolyte. For this purpose, the battery cell housing may be subdivided into a wet area and the said dry area, whereby the switching elements or at least part of the switching elements may be accommodated in the dry area. For example, the switching elements could be arranged in the proximity of the battery cell terminals.

A further advantageous embodiment of the invention provides for the control unit to have appropriate control units integrated in the battery cells, and which are designed to communicate with one another and control the relevant switching elements. The battery cells per se thus contain appropriate intelligence via the individual control units, which is able to connect and disconnect the respective battery cells. Thus, decentralized control of the switching elements is possible, e.g., by the individual control units of the battery cells communicating with one another. In the alternative or additionally, it is also possible to conduct central control of the switching elements, whereby, e.g., only the control unit alone may be arranged, e.g., outside the battery cells, although inside the battery housing. A hybrid solution is also possible, whereby the control unit makes, e.g., higher-level control decisions, such that the control units integrated in the battery cells actually control the switching elements. The control of the switching elements may also be designed redundantly via a higher-level control system and the integrated control units, such that the control of the switching elements may be made particularly failsafe.

A further advantageous embodiment of the invention provides that the control unit is designed to control the switching elements of the battery cells in order to meet a power request of an electric machine. If, for example, the battery is used in an electric vehicle, a specific power may be requested, depending on the driver's accelerator pedal position. If, for example, the accelerator pedal is fully depressed, the control unit may be able to connect all, or at least a major part of the cell branches and thus the respective galvanic cells for energy and power supply. If, however, the relevant vehicle is traveling at a modest speed along a freeway and with no acceleration, e.g., due to the cruise control being turned on, then the control unit can bypass part of the switching elements and connect only a part of the switching elements in order to fulfil this power request, which is reduced relative to full throttle. In particular, if not all battery cells are needed for the energy or power supply, the individual battery cells may also be connected or disconnected alternately, e.g., in order to prevent strong heat generation in the battery cells. In addition, such a procedure may empty the battery cells in a particularly uniform fashion.

A further advantageous embodiment of the invention provides that the control unit is designed to control the switching elements of the battery cells in order to adapt the battery to a voltage level of a charging device. For example, the battery may be a high-voltage battery, which has a nominal voltage of, e.g., 800 V. If, on the other hand, the battery is installed in an electric vehicle, and is used to start up a charging device, the charging device may only have a voltage level of, e.g., 400V. In this case, it is possible for the control unit to control the switching elements of the battery cells in order to adapt the battery to the lower voltage level of the charger, such that only 400V likewise is applied between the poles of the battery by bypassing some of the battery cells by actuating the switching elements accordingly. Thus, it is possible to effortlessly charge the battery, without adapting the charger, e.g., by connecting or disconnecting the individual battery cells, as needed, until all the battery cells have been fully charged. In this context, it is also possible to operate the switching elements, such that the battery cells are connected and disconnected particularly intelligently, depending on how they are heated during the charging process, such that no hotspots occur and the battery, as a whole, can be charged particularly gently.

A further advantageous embodiment of the invention provides that the control unit is designed to control the switching elements of the battery cells in order to bypass defective battery cells This makes it possible, at the cell level, to bypass individual defective battery cells via the respective bypass branches, and thus remove them from the power supply, including during charging processes. Even if some of the battery cells of the battery are defective, the battery as a whole can still be easily operated in a trouble-free manner. Reduction of the battery leads only gauged by how many individual battery cells are no longer used. There is no need, as is usually the case, to shut down whole modules or even the entire battery.

A further advantageous embodiment of the invention provides that the control unit is designed to control the switching elements of the battery cells in order to equalize aging of the battery cells. This can be done both when charging and discharging the battery, and thus the battery cells. The most different parameters or measured values, which can be used to determine the so-called State of Health, abbreviated SOH, can be detected in this context and evaluated by the control unit. In this way it is possible to equalize the aging process of the battery cells by connecting and disconnecting the individual battery cells accordingly. As a result, the battery life and power as a whole can be improved overall.

A further advantageous embodiment of the invention provides that the battery has a selection circuit allowing for a part of the battery cells to be dynamically connected to at least one secondary branch of the battery. Particularly in connection with fully autonomous operation of electric vehicles or hybrid vehicles, two 12 V batteries may be provided in a redundant fashion, e.g., for an on-board electric system. By means of the battery according to the invention, it is now possible to forgo one of these 12 V batteries. That is because the said selection circuit makes it possible to interconnect a part of the battery cells dynamically in order to form at least one secondary branch of the battery, whereby the otherwise required second 12V battery is virtually replaced or branched off.

The selection circuit may, e.g., have one or more multiplexers, whereby the individual battery cells can be connected dynamically in different constellations to the said secondary branch, which then ends up in, e.g., a DC-DC converter, allowing for the required on-board voltage to be made available. Should, for example, an additional battery for supplying the on-board power supply fail, it is possible to replace such failed battery with the battery according to the invention and the said selection circuit. It then becomes possible to save installation space and the corresponding weight of the said additional battery, e.g., in the form of a 12V or 48V battery. Still, a particularly failsafe energy supply system is generally provided.

A further advantageous embodiment of the invention provides that the battery cells are interconnected in parallel to the respective cell blocks, which in turn are interconnected in series. It is thus, for example, possible for the control unit to connect or disconnect whole cell blocks by correspondingly actuating the switching elements, thus allowing for the connection and disconnection of individual battery cells of the respective cell blocks, as described above.

A further advantageous embodiment of the invention provides for each of the battery cells to have at least one sensor for detecting at least one operating parameter, which is set up to transmit data relating to the operating parameter to the control unit. This can be done, e.g., via a bus system or, e.g., wirelessly. Preferably, the relevant sensors are thus integrated in the battery cells, which can detect and monitor different operating parameters. For example, it is possible to monitor voltages, currents, cell pressures, and the like, for each battery cell. Data related thereto can then be transmitted to the control unit, which in turn can control the switching elements by taking these data into account, e.g., in order to bypass defective battery cells, equalize the ageing of the battery cells, enable particularly favorable thermal control of the battery cells, and the like This allows for battery optimization at the cell level.

A further advantageous embodiment of the invention provides for the control unit to be designed to control the switching elements of the battery cells only within a specified maximum load applied to the battery cells, and preferably only in the load-free state. For example, the battery may have one or more contactors, which may be opened and closed in order to interrupt or add a load, and thus a current, at the total battery level. It is preferably provided that the control unit switches the switching elements of the battery cells in the load-free state or only at very low loads, i.e., below the specified maximum load, such that the switching elements are not affected.

A further advantageous embodiment of the invention provides that the control unit is designed to control the switching elements of the battery cells above the specified maximum load, if at least one specified exception condition is present. If, for example, the battery is used to power an electric vehicle, this specified exception may apply, for example, if a driver kicks down, in which case the control unit may also be permitted to operate the switching elements of the battery cells, even under load. For example, the relevant driver, while overtaking a truck with the electric vehicle, may realize during the maneuver the need to accelerate even more in order to effortlessly and, in particular, safely pass the truck. This may be additionally detected, e.g., by a corresponding vehicle sensor system and transmitted to the control unit. In this case, it would be advisable that, if needed, i.e., with an increased demand for power and torque, the control unit is able to switch the switching elements even under load, possibly even under full load, such that all the energy and power that can be provided by the battery is made available. The said exceptions may be defined, e.g., by the factory, or, e.g., be freely configurable by the user.

The motor vehicle according to the invention comprises the battery according to the invention or an advantageous embodiment of the battery according to the invention.

In the method according to the invention for operating the battery according to the invention or an advantageous embodiment of the battery according to the invention, the control unit of the battery controls the switching elements of the battery cells, such that the galvanic cells of the battery cells are connected or bypassed, while meeting at least one specified request. Advantageous embodiments of the battery according to the invention are to be deemed advantageous embodiments of the method according to the invention and vice versa, whereby the battery, in particular, has means for implementing the method steps.

Further advantages, features and details of the invention will become clear from the embodiments described below and in reference to the drawing. The features and their combinations mentioned above in the description, including the features and their combinations shown below in the description of the figures and/or in the individual figures may be used not only in the appropriately specified combination, but also in other combinations or individually, without deviating from the scope of the invention.

BRIEF DESCRIPTION OF THE DRAWINGS

In the drawings.

Identical or functionally identical elements are shown with the same reference numerals.

DETAILED DESCRIPTION

Figure 1:
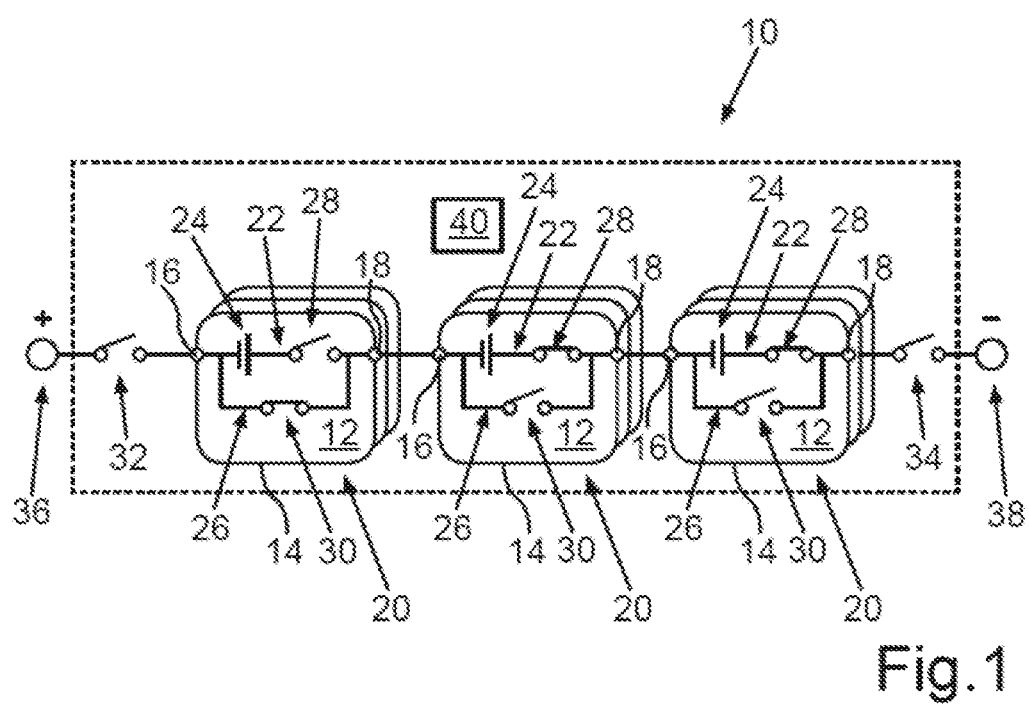
FIG. 1 is a schematic representation of a battery having multiple battery cells comprising the relevant battery cell housings with electric terminals, via which the battery cells are electrically interconnected, wherein several of the battery cells are connected in parallel to the relevant cell blocks, which in turn are interconnected in series.

FIG. 1 is a schematic diagram of a battery 10. The battery 10 may be designed for use, e.g., in an electric vehicle or a hybrid vehicle. Basically, the battery 10 may be used to power any device. The battery 10 comprises multiple battery cells 12, each of which has a battery cell housing 14 with electric terminals 16, 18, via which the battery cells 12 are electrically interconnected. In the embodiment of the battery 10 shown here, the battery cells 12 are interconnected in parallel to the respective cell blocks 20, which in turn are interconnected in series to form the whole battery 10.

In each of the battery cell housings 14, a cell branch 22 with a galvanic cell 24 connecting the terminals 16, 18 is arranged. The galvanic cell 24 may be, e.g., a lithium-ion cell or, e.g., a fuel cell. In principle, the galvanic cells 24 may be any galvanic cells.

In addition, a bypass branch 26 is arranged in each of the battery cell housings 14 in order to bypass the relevant galvanic cells 24 Each cell branch 22 comprises a first switching element 28 for opening and closing the cell branch 22, each bypass branch 26 having a second switching element 30 for opening and closing the respective bypass branch 26. In other words, the cell branches 22 and bypass branches 26 are respective switching branches within the respective battery cells 12 The switching elements 28, 30 are preferably electronic switches, such as field-effect transistors, bipolar transistors, or diodes. However, it is also possible per se that the switching elements 28, 30 are, e.g., electromechanical switches, e.g., relays. It is especially important for the switching elements 28, 30 that they are able to interrupt and close the cell branches 22 and the bypass branches 26 with regard to a current flow.

The battery 10 also includes two contactors 32, 34, which can be used to interrupt a current flow through the battery 10 from a positive pole 36 of the battery 10 to a negative pole 38 of the battery 10. Moreover, the battery 10 comprises a control unit 40, represented only schematically, which is designed to control all the switching elements 28, 30 of the battery cells 12, such that the galvanic cells 24 of battery cells 12 are connected or bypassed, while meeting at least one specifiable request. The control device 40 may also include other control units, not shown here, which may each be arranged in the battery cell housings 14. These control units, not shown here, may be used for the actual control of the switching elements 28, 30, such that decentralized control of the switching elements 28, 30 is possible. The control unit 40 may also have a higher-level control unit, not shown here, which, for example, can coordinate the switching units arranged in the battery cells 12. Furthermore, it is also possible that both decentralized control of the switching elements 28, 30 is done via the switching units integrated in the battery cells 12 and/or central control of the switching elements 28, 30 via the said further higher-level control unit, which is arranged outside the battery cells 12, although inside the battery 10.

The switching elements 28, 30 can be arranged, e.g., in a respective wet area of the battery cell housing 14, in which an electrolyte of the respective galvanic cells 24 is accommodated. Alternatively, it is also possible that the switching elements 28, 30 are arranged in a respective dry area of the battery cell housing 14 spatially separated from an electrolyte, i.e., the said wet area of the respective galvanic cells 24.

The control unit 40 may be designed, e.g., to control the switching elements 30 of the battery cells 12 in order to meet a power request of an electric machine. For example, the battery 10 may be installed in an electric vehicle or even in a hybrid vehicle. Depending on which power is required to drive the vehicle, some of the galvanic cells 24 can be connected or bypassed dynamically, and as needed. The same applies at the level of cell blocks 20. Thus, for example, in one of the cell blocks 20, all the switching elements 30 of the battery cells 12 may be closed and all the switching elements 28 of the battery cell 12 opened, or vice versa.

If, for example, the full power of an electric machine of the vehicle is requested by a respective accelerator pedal position, the control unit can receive an appropriate signal, as a result of which, the control unit closes all switching elements 28 and opens all switching elements 30, whereby all galvanic cells 24 are connected to the power and energy supply. On the other hand, if driving, e.g., at a relatively modest and constant speed, e.g., with the aid of cruise control on a main road, the control unit can connect some of the galvanic cells 24—or even whole cell blocks 20—and bypass some of the galvanic cells 24 by actuating the switching elements 28 or 30 accordingly. Thus, it is possible to meet different power requests dynamically and as needed at the cell level by means of the battery 10.

Furthermore, the control unit 40 can also control the switching elements 28, 30 of the battery cells 12 in order to adapt the battery 10 to a voltage level of a charging device. For example, it is conceivable that the battery 10 is a high-voltage battery, wherein 800V is applied between poles 36, 38 in normal operation, e.g., during operation in an electric vehicle. If the electric vehicle subsequently approaches a charging device, for example a charging column, or the like, which only has a voltage of 400V, the control device 40 can then open and close the switching elements 28 and 30, respectively and accordingly, such that between the poles 36, 38 of the battery 10 there is only a voltage of 400V. In addition, e.g., some of the cell blocks 20 can be completely bypassed temporarily, such that the galvanic cells 24 contained therein are completely bypassed. During the charging process of the battery 10, and particularly also with regard to smart thermal management, the control unit 40 may interfere, such that the individual battery cells 12, or more precisely, the galvanic cells 24, are connected and bypassed, as needed, such that the result is a particularly good temperature control, when charging the battery 10. The individual battery cells 12 can thus be charged sequentially, and in particular also alternately, by connecting and disconnecting the galvanic cells 24.

The control unit 40 may also be designed to control the switching elements 28, 30 in order to equalize the aging of the individual battery cells 12. The battery 10, more precisely the control unit 40, may thus monitor the so-called State of Health, in short SOH, of the individual galvanic cells 24 and ensure that the individual galvanic cells 24 are connected and bypassed in closest possible conformity with the SOH in order to enable particularly uniform ageing of the individual galvanic cells 24.

Moreover, the control unit 40 may also control the switching elements 28, 30, such that individual defective battery cells 12 are bypassed. Thus, it is possible to bypass individual defective battery cells 12 at the cell level, while still using the battery 10 for energy supply or power supply. In other words, the whole cell blocks 20, or even the whole battery 10, need not be taken out of operation, if individual battery cells 12 are damaged. This can be particularly advantageous, if the battery 10 is used in a motor vehicle to supply power to an electric drive, as the relevant vehicle will not come to a rest, if there is a defect in individual battery cells 12.

Cells 12 can integrate a wide variety of sensors, not shown here, which measure a wide range of operating parameters and transmit the relevant data to the control unit 40. For example, it is possible to measure individual voltages, currents, internal cell pressures, temperatures, and the like, at the cell level, whereby the relevant data is transferred to the control unit 40. Taking these data into account, the control unit 40 may then control and actuate the switching elements 28, 30, such that, e.g., the temperature of the individual battery cells 12 is particularly favorable and the ageing of the battery cells 12 occurs particularly slowly or slightly.

Preferably, the control unit 40 is designed to switch the switching elements 28, 30 only in the load-free state, i.e., if one or both contactors 32, 34 have previously been opened. Consequently, the preferably electronic switching elements 28, 30 are protected during the respective switching operations. It may also be provided, e.g., that a certain maximum load is specified, whereby the control unit 40 only closes or opens the individual switching elements 28, 30 if this maximum load is not exceeded. In exceptional situations, however, the control unit 40 may be allowed to switch the switching elements 28, 30 even above the specified maximum load, even under full load. If the battery 10 is used, e.g., drive an electric or a hybrid vehicle, traffic situations may come about dictating that switching operations of the switching elements 28, 30 be performed, even under full load, in order to avert a critical traffic situation.

Figure 2:
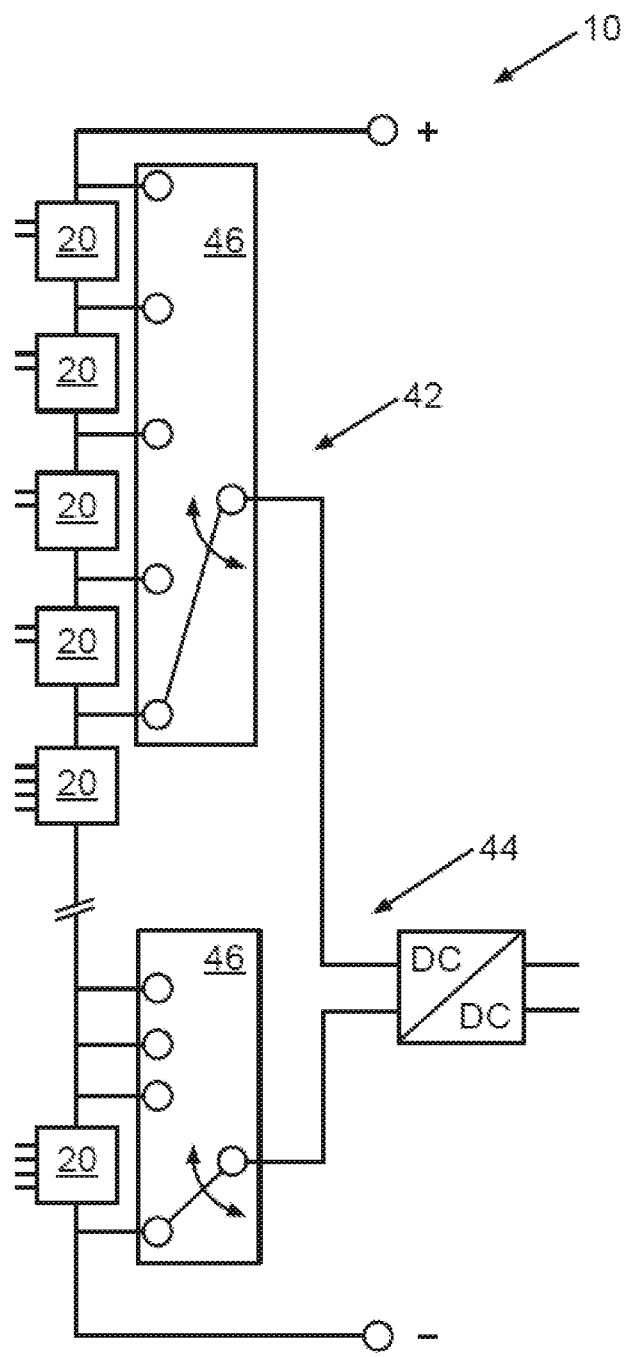
FIG. 2 is a further schematic representation of the battery depicting a selection circuit in the form of two multiplexers, wherein a part of the cell blocks, which comprises the respective battery cells, may be connected dynamically to a secondary branch of the battery.

In FIG. 2, the battery 10 is represented in a further schematic diagram, wherein the individual battery cells 12 are no longer represented. Instead, only the individual cell blocks 20, which are interconnected in series, are schematically represented. The battery 10 comprises a selection circuit 42, whereby part of the battery cells may be dynamically connected to a secondary branch 44 according to the present embodiment of the appropriate cell brocks 20 shown here. For this purpose, the selection circuit 42 comprises two multiplexers 46 which may interconnect different numbers of the cell blocks 20 to the secondary branch 44 through corresponding switching operations. How many of the galvanic cells 24 are connected to each cell block 20 is shown schematically by the respective unspecified lines at the cell blocks 20. In addition to the interconnection of the cell blocks by means of the multiplexers 46, it is also possible to bypass or connect the individual galvanic cells 24 within the cell blocks 20 in the manner already described.

The selection circuit 42 indicated in FIG. 2 can, e.g., be used particularly advantageously, if the battery 10 is used in an autonomous electric vehicle. When driving autonomously, many system components are often designed redundantly for safety reasons. This also applies, e.g., to batteries that are used to supply the on-board power supply and not the electric drive unit. Thus, in addition to the battery 10 shown here, e.g., two 12V batteries must also be carried along. By means of the battery 10, it is possible to replace one of these 12V batteries, if needed. By means of the selection circuit 42, or more precisely by means of appropriate actuation of the multiplexer 46, power and energy can be diverted from the battery 10 for the secondary branch 44 If, for example, the relevant vehicle only has a 12V battery for the on-board power supply and this battery fails, it is possible to divert power and energy from battery 10 to the secondary branch 44 by using multiplexer 46. With slightly reduced drive power, it is still possible to maintain an on-board power supply of the relevant vehicle without any problems, as well as safely. Multiple tapping for further sub-branches, not shown here, is of course also possible. It is of course also possible to connect and bypass individual battery cells 12 in the way already described in connection with FIG. 1, and as required, by actuating the switching elements 28, 30. Thus, it is possible to vary the number of connected or bypassed galvanic cells 24 per cell block 20. This allows, e.g., for meeting changing power requests on the part of the electric drive and the vehicle electric system.

With the described battery 10, it is thus possible in a variety of ways to meet the most varied requests at the cell level and to connect and bypass the individual battery cells 12, if necessary, by actuating the switching elements 28, 30 integrated in the battery cell housings 14 accordingly. The battery 10 is thus a dynamically configurable battery system at the cell level. This opens up completely new possibilities of battery control over existing battery systems.

The invention claimed is:

1. A battery for a motor vehicle, comprising multiple battery cells, which have respective battery cell housings with electric terminals, via which the battery cells are electrically interconnected,
   - wherein a cell branch connecting the terminals and having a galvanic cell is arranged in the respective battery cell housings;
   - wherein a bypass branch for bypassing the respective galvanic cell is arranged in the respective battery cell housings;
   - wherein each cell branch has a first switching element for opening and closing the cell branch and each bypass branch has a second switching element for opening and closing the bypass branch;
   - wherein the battery has a control unit, which is designed to control all the switching elements of the battery cells, such that the galvanic cells of the battery cells are connected or bypassed to accommodate a power request of an electric machine of the motor vehicle;
   - wherein the control unit is designed to control the switching elements of the multiple battery cells only below a specified maximum load applied to the multiple battery cells; and
   - wherein the control unit is configured to control the switching elements of the multiple battery cells above the specified maximum load only when at least one exceptional condition relating to a traffic situation of the motor vehicle is present.

2. The battery according to claim 1, wherein at least part of the switching elements is arranged in a respective wet area of the battery cell housing, in which an electrolyte of the respective galvanic cells is accommodated.

3. The battery according to claim 1, wherein at least part of the switching elements is arranged in a respective dry region of the battery cell housing spatially separated from an electrolyte of the respective galvanic cells.

4. The battery according to claim 1, wherein the control unit has respective control units integrated into the battery cells, which are adapted to communicate with one another and control the respective switching elements.

5. The battery according to claim 1, wherein the control unit is designed to control the switching elements of the battery cells in order to meet a power request of an electric machine.

6. The battery according to claim 1, wherein the control unit is designed to control the switching elements of the battery cells in order to adapt the battery to the voltage level of a charging device.

7. The battery according to claim 1, wherein the control unit is designed to control the switching elements of the battery cells in order to bypass defective battery cells.

8. The battery according to claim 1, wherein the control unit is designed to control the switching elements of the battery cells in order to equalize aging of the battery cells.

9. The battery according to claim 1, wherein the battery has a selection circuit, whereby a part of the battery cells can be dynamically connected to at least one secondary branch of the battery.

10. The battery according to claim 1, wherein the battery cells are interconnected in parallel with respective cell blocks, which in turn are interconnected in series.

11. The battery according to claim 1, wherein the battery cells each have at least one sensor for detecting at least one operating parameter, which is designed to transmit data relating to the operating parameter to the control unit.

12. The battery according to claim 1, wherein the power request of the electric machine of the motor vehicle is of a primary circuit of the battery, and
   - wherein the battery has a secondary circuit, independent of the primary circuit, whereby a part of the multiple battery cells may be dynamically diverted through a selection circuit to accommodate a power demand of the secondary circuit.

13. A method for operating a battery for a motor vehicle comprising;
   - control of switching elements provided in each of multiple battery cell of the battery by a control unit, such that galvanic cells of each of the battery cells are connected or bypassed to accommodate a power request of an electric machine of the motor vehicle,
   - wherein each of the multiple battery cells comprises a battery cell housing with electric terminals, the battery cell housing containing the galvanic cell, a cell branch connecting the galvanic cell to the electric terminals, a bypass branch for bypassing the galvanic cell, a first switching element for opening and closing the cell branch, and a second switching element for opening and closing the bypass branch;
   - wherein the control unit is designed to control the switching elements of the multiple battery cells only below a specified maximum load applied to the multiple battery cells; and
   - wherein the control unit is configured to control the switching elements of the multiple battery cells above the specified maximum load only when at least one exceptional condition relating to a traffic situation of the motor vehicle is present.

\* \* \* \* \*